(12) United States Patent
Rees et al.

(10) Patent No.: US 12,497,173 B2
(45) Date of Patent: Dec. 16, 2025

(54) PASSENGER SEAT UNIT WITH FOLDABLE DOOR

(71) Applicant: Safran Seats GB Limited, Cwmbran (GB)

(72) Inventors: Gethin Rees, Cwmbran (GB); Christian Cosway, Cwmbran (GB); Kerry Morgan, Cwmbran (GB); Tracey Roberts, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 155 days.

(21) Appl. No.: 17/762,534

(22) PCT Filed: Oct. 29, 2020

(86) PCT No.: PCT/IB2020/060165
§ 371 (c)(1),
(2) Date: Mar. 22, 2022

(87) PCT Pub. No.: WO2021/084474
PCT Pub. Date: May 6, 2021

(65) Prior Publication Data
US 2022/0355935 A1 Nov. 10, 2022

Related U.S. Application Data

(60) Provisional application No. 62/927,387, filed on Oct. 29, 2019.

(51) Int. Cl.
*B64D 11/06* (2006.01)
*B64D 45/00* (2006.01)

(52) U.S. Cl.
CPC .......... *B64D 11/0606* (2014.12); *B64D 45/00* (2013.01)

(58) Field of Classification Search
CPC ... B64D 11/0606; B64C 1/1469; E05B 39/00; E05B 41/00; Y10S 70/59; E05C 7/02
See application file for complete search history.

(56) References Cited

U.S. PATENT DOCUMENTS

| | | | |
|---|---|---|---|
| 4,100,857 A | 7/1978 | Gutridge et al. | |
| 6,357,806 B1 * | 3/2002 | Saku | B64D 11/0007 70/432 |

(Continued)

FOREIGN PATENT DOCUMENTS

| | | |
|---|---|---|
| CN | 106812425 A | 6/2017 |
| CN | 108150056 A | 6/2018 |

(Continued)

OTHER PUBLICATIONS

International Patent Application No. PCT/IB2020/060165, International Search Report and Written Opinion, dated Feb. 2, 2021.

(Continued)

*Primary Examiner* — Nicholas McFall
*Assistant Examiner* — Eric Acosta
(74) *Attorney, Agent, or Firm* — Kilpatrick Townsend & Stockton LLP (57) ABSTRACT

A passenger seating unit for a vehicle, such as an aircraft, includes a privacy shell and a door. The privacy shell at least partially defines a passenger seat area, and the privacy shell includes an opening for allowing entry to and exit from the seat unit. A passenger seat may be provided in the passenger seat area. The door is supported on the privacy shell and includes a first panel and a second panel. The second panel is pivotably connected to the first panel such that the second panel is movable relative to the first panel between a folded position and an unfolded position. In the folded position, the door is movable in a forward and aft direction relative to the privacy shell.

16 Claims, 8 Drawing Sheets

(56) References Cited

U.S. PATENT DOCUMENTS

2014/0123571 A1* 5/2014 Swain ................ B64D 11/0023
29/401.1
2018/0281963 A1* 10/2018 Dowty ............... B64D 11/0606

FOREIGN PATENT DOCUMENTS

| CN | 110087938 A | 8/2019 | | |
|---|---|---|---|---|
| EP | 0159206 A1 | 10/1985 | | |
| GB | 531334 A | 1/1941 | | |
| GB | 2563150 A | 12/2018 | | |
| GB | 2563150 B | * | 7/2019 | ........... B64C 1/1423 |
| WO | WO-2018093825 A1 | * | 5/2018 | ............. B60N 2/005 |

OTHER PUBLICATIONS

Chinese Application No. 202080076141.5, Office Action mailed on May 13, 2024, 11 pages (9 pages of Original Document and 2 pages of English Translation).
China Appl. No. 202080076141.5, Office Action, Dec. 11, 2024, 9 pages.
Chinese Application No. 202080076141.5, Office Action mailed on May 28, 2025, 7 pages.

* cited by examiner

PASSENGER SEAT UNIT WITH FOLDABLE DOOR

CROSS REFERENCE TO RELATED APPLICATION

This application claims the benefit of U.S. Provisional Application No. 62/927,387, filed on Oct. 29, 2019, and entitled HINGED DOOR HELD OPEN FOR TTL, the content of which is hereby incorporated by reference in its entirety.

FIELD OF THE INVENTION

The field of the invention relates to passenger seat units, such as mini suites, having a passenger seat area, and more particularly to privacy screens, walls, or doors that divides the passenger seat area from an aisle area or other common area.

BACKGROUND

Many vehicles such as passenger aircraft, buses, trains, ships, automobiles, and the like include seats that passengers may use during travel. Some vehicles include seats that are provided with passenger seat units, such as mini suites, having privacy shells or screens that enable a passenger occupying the seat to have an enclosed feeling. For example, a privacy screen, wall, or sliding door may be provided that divides a passenger seat area with the passenger seat from the aisle area or other common area. To fully close off the passenger seat area, some passenger seat units may include privacy doors or screens (collectively a "privacy feature"), and airline crew and/or other passengers cannot see in to the suite and/or cannot access the suite without moving a door.

While passenger comfort and privacy are important considerations in passenger seat unit design, passenger seat units are also subject to safety requirements established by governments or other standard-setting organizations. For example, some regulations require that no door may be installed between any passenger and any emergency exit space or aisle during certain situations such as taxiing, takeoff, and landing (TTL). Other regulations may require that the door must be openable even if an adjacent aisle is crowded. Accordingly, any privacy feature that may be associated with the passenger seat must allow a safe and timely exit from the passenger seat unit.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat unit includes a privacy shell and a door. The privacy shell at least partially defines a passenger seat area, and the privacy shell includes an opening for allowing entry to and exit from the seat unit. The door is supported on the privacy shell and includes a first panel and a second panel. The second panel is pivotably connected to the first panel such that the second panel is movable relative to the first panel between a folded position and an unfolded position. A length of the door in the folded position is less than a length of the door in the unfolded position. In various embodiments, in the folded position, the door is movable in a forward and aft direction relative to the privacy shell.

In various embodiments, the door is slidable in the forward and aft direction relative to the privacy shell. In some embodiments, in the unfolded position, the door is movable in the forward and aft direction relative to the privacy shell and, in a forward-most position or an aft-most position, the door in the unfolded position obstructs the opening of the privacy shell. In certain embodiments, in the folded position, the door is movable in the forward and aft direction between a forward-most position and an aft-most position, and in both the forward-most position and the aft-most position, the door in the folded position maintains at least portion of the opening that is unobstructed by the door.

The passenger seat unit may include at least one vertical hinge pivotably connecting the first panel and the second panel of the door. In some embodiments, the first panel defines an aft edge of the door, and the door includes a door latch that selectively secures the second panel to the first panel in the folded position. The door may also include an indicator along the aft edge of the door that provides a visual indication of whether the second panel is latched or unlatched to the first panel. In certain embodiments, the privacy shell includes a shell latch that selectively secures the door in a forward-most position or an aft-most position. The shell latch may include an indicator that provides a visual indication of whether the door is latched or unlatched to the shell latch.

According to certain embodiments of the present invention, a passenger seat unit includes a privacy shell that at least partially defines a passenger seat area and includes an opening for allowing entry to and exit from the seat unit. The passenger seat unit also includes a door supported on the privacy shell. The door includes a first panel and a second panel that is pivotably connected to the first panel such that the second panel is movable relative to the first panel between a folded position and an unfolded position. In the folded position, the door is movable in a forward and aft direction relative to the privacy shell between a forward-most position and an aft-most position. In various embodiments, in both the forward-most position and the aft-most position, the door in the folded position maintains at least portion of the opening that is unobstructed by the door.

In some embodiments, in the unfolded position, the door is movable in the forward and aft direction relative to the privacy shell and, in a forward-most position or an aft-most position, the door in the unfolded position obstructs the opening of the privacy shell. In certain embodiments, the passenger seat unit includes at least one vertical hinge pivotably connecting the first panel and the second panel of the door. In various embodiments, the door is slidable in the forward and aft direction relative to the privacy shell.

The first panel may define an aft edge of the door. In some embodiments, the door includes a door latch that selectively secures the second panel to the first panel in the folded position. In various embodiments, the door includes an indicator along the aft edge of the door, and the indicator provides a visual indication of whether the second panel is latched or unlatched to the first panel. In certain embodiments, the privacy shell includes a shell latch that selectively secures the door in a forward-most position or an aft-most position. The shell latch may include an indicator that provides a visual indication of whether the door is latched or unlatched to the shell latch.

In some embodiments, the passenger seat unit is an aircraft passenger seat unit. The passenger seat unit may include a passenger seat in the passenger seat area. In some embodiments, the passenger seat unity includes a dual latch system that selectively retains the door in the folded position and in the forward-most position or the aft-most position. The dual latch system may include a door latch on the first panel that selectively secures the second panel to the first panel in the folded position and a shell latch on the privacy shell that selectively secures the door in the forward-most position or the aft-most position.

According to certain embodiments of the present invention, a passenger seat unit includes a privacy shell and a door. The privacy shell at least partially defines a passenger seat area, and the privacy shell includes an opening for allowing entry to and exit from the seat unit. The door is supported on the privacy shell and includes a first panel having a first surface and a second surface. The door also includes a second panel having a first surface and a second surface. In various embodiments, the second panel pivotably connected to the first panel such that the second panel is movable relative to the first panel between a folded position and an unfolded position. In the folded position, the first surface of the second panel faces the first surface of the first panel, and, in the unfolded position, the first surface of the second panel and the first surface of the first panel face a same direction. In certain embodiments, in the folded position, the door is movable in a forward and aft direction relative to the privacy shell.

In various embodiments, the door is slidable in the forward and aft direction relative to the privacy shell. In some embodiments, the passenger seat unity includes at least one vertical hinge pivotably connecting the second panel to the first panel. A length of the door in the folded position may be less than a length of the door in the unfolded position.

In some embodiments, in the unfolded position, the door is movable in the forward and aft direction between a forward-most position and an aft-most position and, in at least one of the forward-most position or the aft-most position, the door in the unfolded position obstructs the opening of the privacy shell. In certain embodiments, in the folded position, the first surface of the second panel faces a direction towards the passenger seat area and the first surface of the first panel faces in a direction away from the passenger seat area, and in the unfolded position, the first surface of the second panel and the first surface of the first panel both face in the direction away from the passenger seat area.

The first panel may define an aft edge of the door. In certain embodiments, the door includes a door latch on the first panel that selectively secures the second panel to the first panel in the folded position. The door may include an indicator along the aft edge of the door that provides a visual indication of whether the second panel is latched or unlatched to the first panel. In certain embodiments, the privacy shell includes a shell latch that selectively secures the door in a forward-most position or an aft-most position. The shell latch may include an indicator that provides a visual indication of whether the door is latched or unlatched to the shell latch.

In various embodiments, in the folded position, the door is movable in the forward and aft direction between a forward-most position and an aft-most position, and in both the forward-most position and the aft-most position, the door in the folded position maintains at least portion of the opening that is unobstructed by the door.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing. Reference herein to a "forward-most" position or component and an "aft-most" position or component likewise merely refers to the orientation as illustrated and is not meant to require a particular orientation of components, and an "aft-most" position or component illustrated may be a "forward-most" position or component if oriented in such a manner.

The described embodiments of the invention provide passenger seat units with doors. While the passenger seat units are discussed for use with aircraft and/or aircraft seats, they are by no means so limited. Rather, embodiments of the passenger seat units may be used in other vehicles and/or with seats of any type or otherwise as desired.

According to certain embodiments of the invention, as shown in FIGS. 1-16, a passenger seat unit 100 includes a privacy shell 102 and a door 104. The privacy shell 102 defines a passenger seat area 106. As best illustrated in FIGS. 1-6, the privacy shell 102 includes an opening 118 that allows for entry to and exit from the passenger seat area 106. The particular shape of the opening 118 should not be considered limiting on the disclosure. Various passenger features may be provided in the passenger seat area 106 as desired, including but not limited to a passenger seat 108, a bed 110, a tray table 112, an in-flight entertainment screen 116, stowage compartments, closets, reading lights, various other features that may be utilized by the passenger, and/or various other combinations or sub-combination of features as desired. The shape of the privacy shell 102, the privacy seat area 106, and the passenger features illustrated in the privacy seat area 106 should not be considered limiting on the disclosure.

Figure 1:
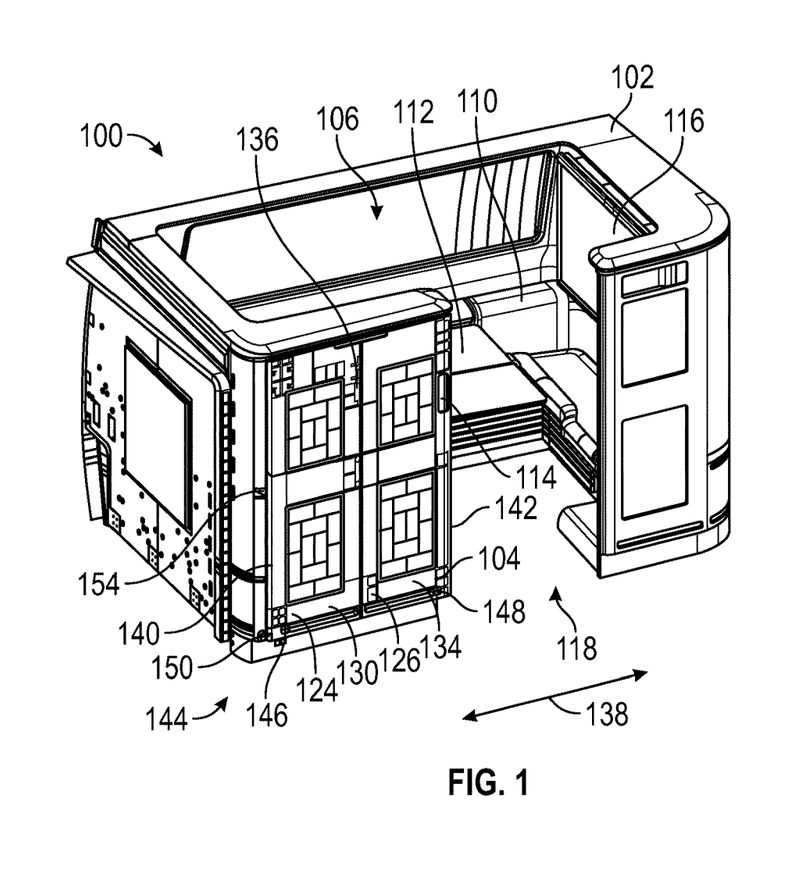
FIG. 1 is a perspective view of a passenger seat unit with a door according to embodiments of the invention where the door is in an unfolded, aft-most position.

The door 104 of the passenger seat unit 100 is supported on the privacy shell 102 and is movable in a forward and aft direction 138 (see FIG. 1). Optionally, the door 104 may include gripping features 114 that the passenger may utilize to facilitate movement of the door 104 between the forward-most position and the aft-most position. In certain aspects, the door 104 may be supported on the privacy shell 102 via various suitable mechanisms or devices such that the door 104 is movable in the forward and aft direction 138. As some non-limiting examples, the door 104 may be slidable along a rail, may be movable via rollers, or may utilize various other mechanisms or devices as desired. In the forward and aft direction 138, the door 104 may be movable between a forward-most position and an aft-most position. As discussed in detail below, in various embodiments, in the forward-most position, the door 104 may at least partially obstruct the opening 118, meaning that the door 104 at least partially covers the opening 118 to further enclose the passenger seat area 106.

Figure 11:
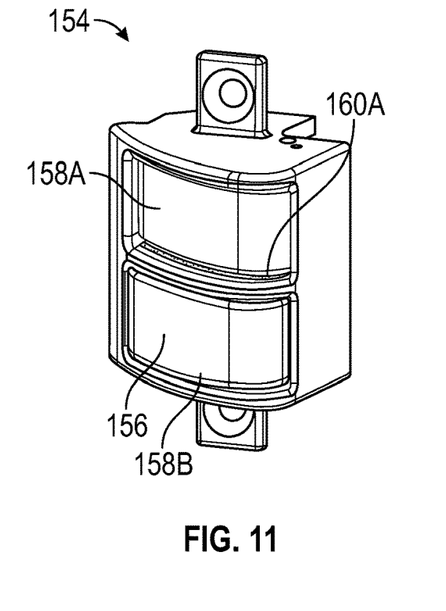
FIG. 11 is a perspective view of a shell latch of the passenger seat unit of FIG. 1.
Figure 12:
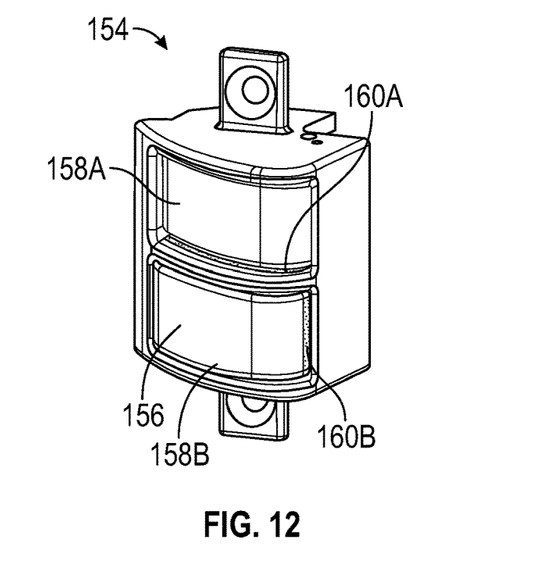
FIG. 12 is another perspective view of the shell latch of FIG. 11.
Figure 13:
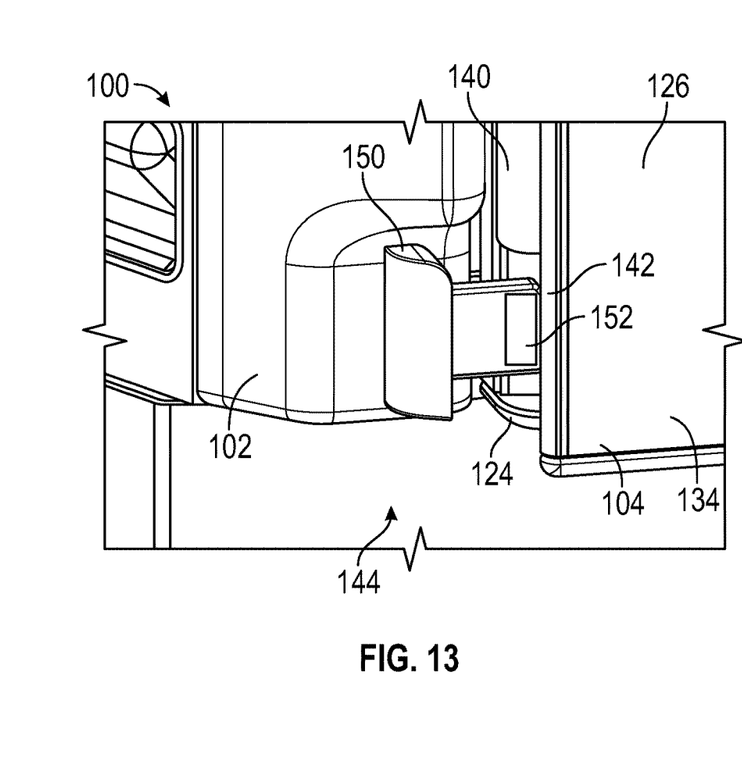
FIG. 13 is a perspective view of a portion of the passenger seat unit of FIG. 1 with the door latch.
Figure 14:
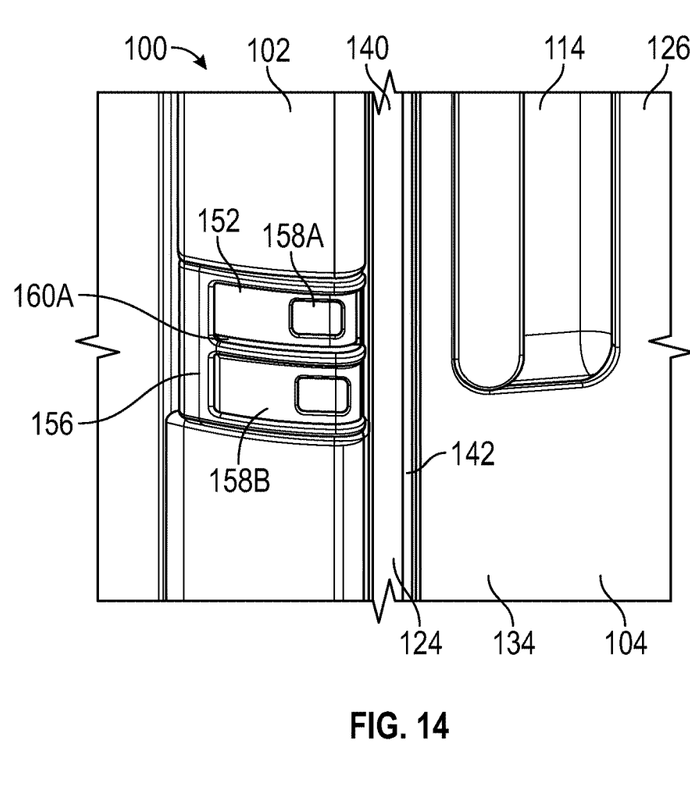
FIG. 14 is a perspective view of another portion of the passenger seat unit of FIG. 1 with the shell latch.

In some embodiments, and as best illustrated in FIGS. 11, 12, and 14, the privacy shell 102 may include a shell latch 154 that selectively engages and retains the door 104 in the aft-most position. It will be appreciated that depending on the type of shell latch 154 utilized, the shell latch 154 may include various other and/or additional components as desired. As such, the particular shell latch 154 illustrated should not be considered limiting, and the shell latch 154 may be various suitable devices or mechanisms for selectively retaining the door 104 in the aft-most position.

In the embodiment illustrated, the shell latch 154 is a slam latch system that selectively engages at least the first panel edge 140. The shell latch 154 engaged with or otherwise connected to the first panel edge 140 may secure the door 104 in the aft-most position, and the shell latch 154 disengaged with the first panel edge 140 may allow for the door 104 to move in the forward and aft direction 138. In some embodiments, the shell latch 154 selectively engaging the first panel edge 140 may improve the ability of the shell latch 154 to retain the door 104 in the aft-most position. However, the particular location of the shell latch 154 on the privacy shell 102 and the portion of component of the door 104 that the shell latch 154 engages should not be considered limiting on the disclosure.

Optionally, and as best illustrated in FIGS. 11 and 12, the shell latch 154 includes an indicator 156 that selectively provides a visual indication of whether the door 104 is secured in the aft-most position. In the embodiment illustrated, the indicator 156 includes buttons 158A-B that may be in an activated configuration indicating that the door 104 is secured in the aft-most position or a deactivated configuration indicating that the door 104 is unsecured. FIGS. 11, 12, and 14 illustrate a non-limiting example of the button 158A in the activated position, and FIG. 12 illustrates a non-limiting example of the button 158B in the deactivated position. As illustrated, in these embodiments, the button (e.g., button 158A) may have a first visual marker 160A indicating that the button is in the activated position and the door 104 is secured in the aft-most position, and the button (e.g., button 158B) may have a second visual marker 160B indicating that the button is in the deactivated position and the door 104 is unsecured in the aft-most position. In these embodiments, at least one visual characteristic of the second visual marker 160B may be different from the first visual marker 160A. In certain embodiments, movement of the indicator 156 from the activated configuration to the deactivated configuration may disengage the shell latch 154 from the door 104 such that the door 104 is no longer secured to the shell latch 154 and/or relative to the privacy shell 102.

In various embodiments, the passenger seat unit 100 may include various devices or mechanisms for selectively securing the door 104 in the forward-most position. Such devices or mechanisms may include, but are not limited to, latch systems, friction fit systems, clips, and/or other suitable devices or mechanisms as desired.

The door 104 of the passenger seat unit 100 includes at least a first panel 124 and a second panel 126. While two panels of the door 104 are illustrated, in other embodiments, the door 104 may have more than two panels as desired. The first panel 124 of the door 104 includes a first surface 128 and a second surface 130 opposite from the first surface 128. The first panel 124 also includes a first panel edge 140. Similarly, the second panel 126 of the door 104 includes a first surface 132 and a second surface 134 opposite from the first surface 132. The second panel 126 also includes a second panel edge 142.

Figure 7:
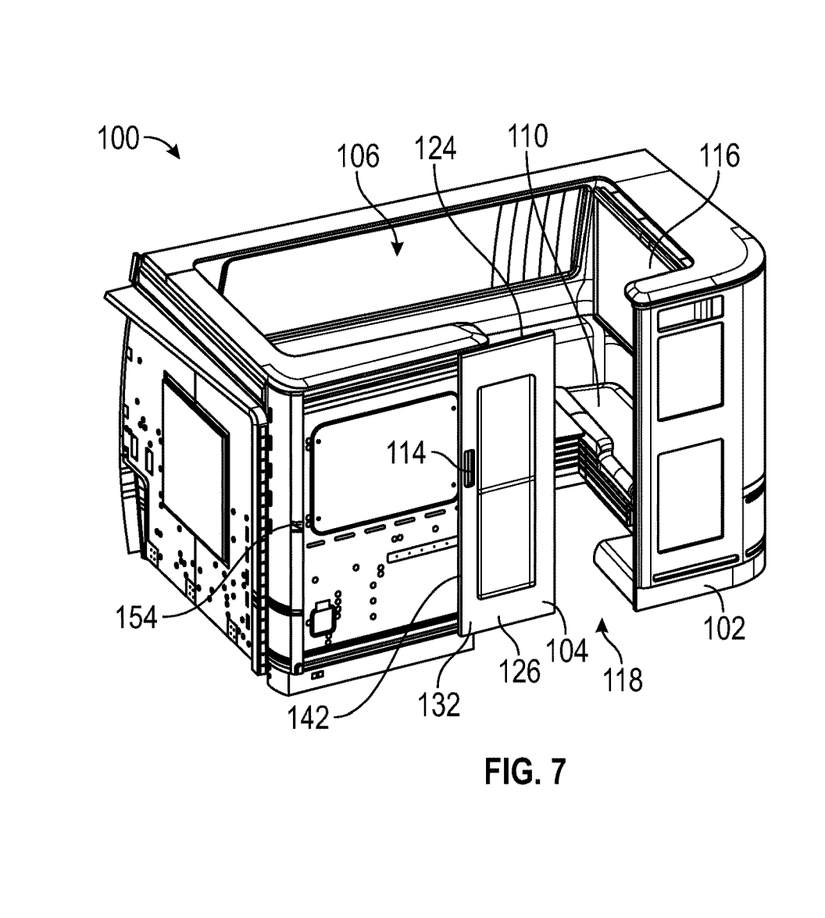
FIG. 7 is a perspective view of the passenger seat unit of FIG. 1 with the door in a folded, forward-most position.
Figure 8:
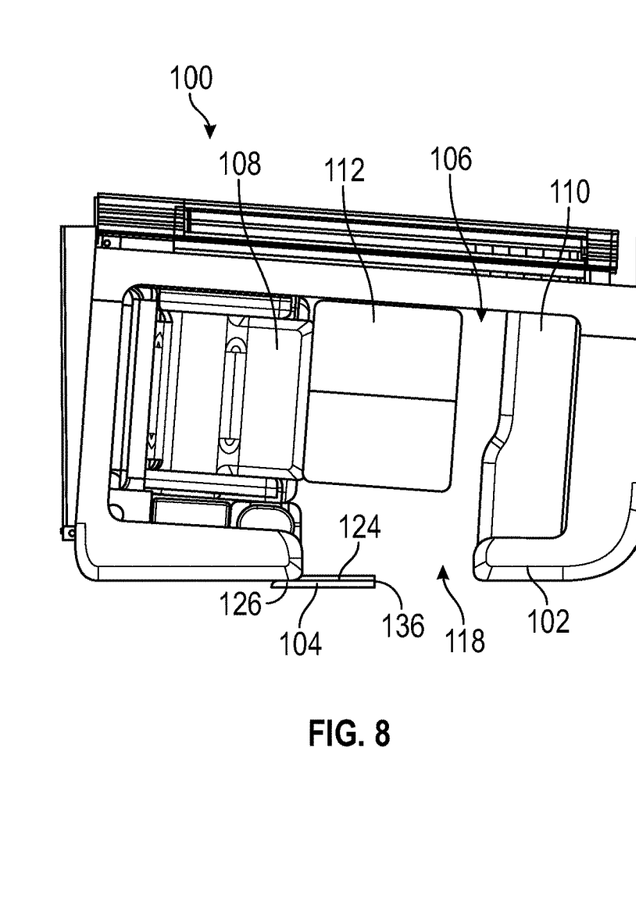
FIG. 8 is a top view of the passenger seat unit of FIG. 1 with the door in the position of FIG. 7.
Figure 9:
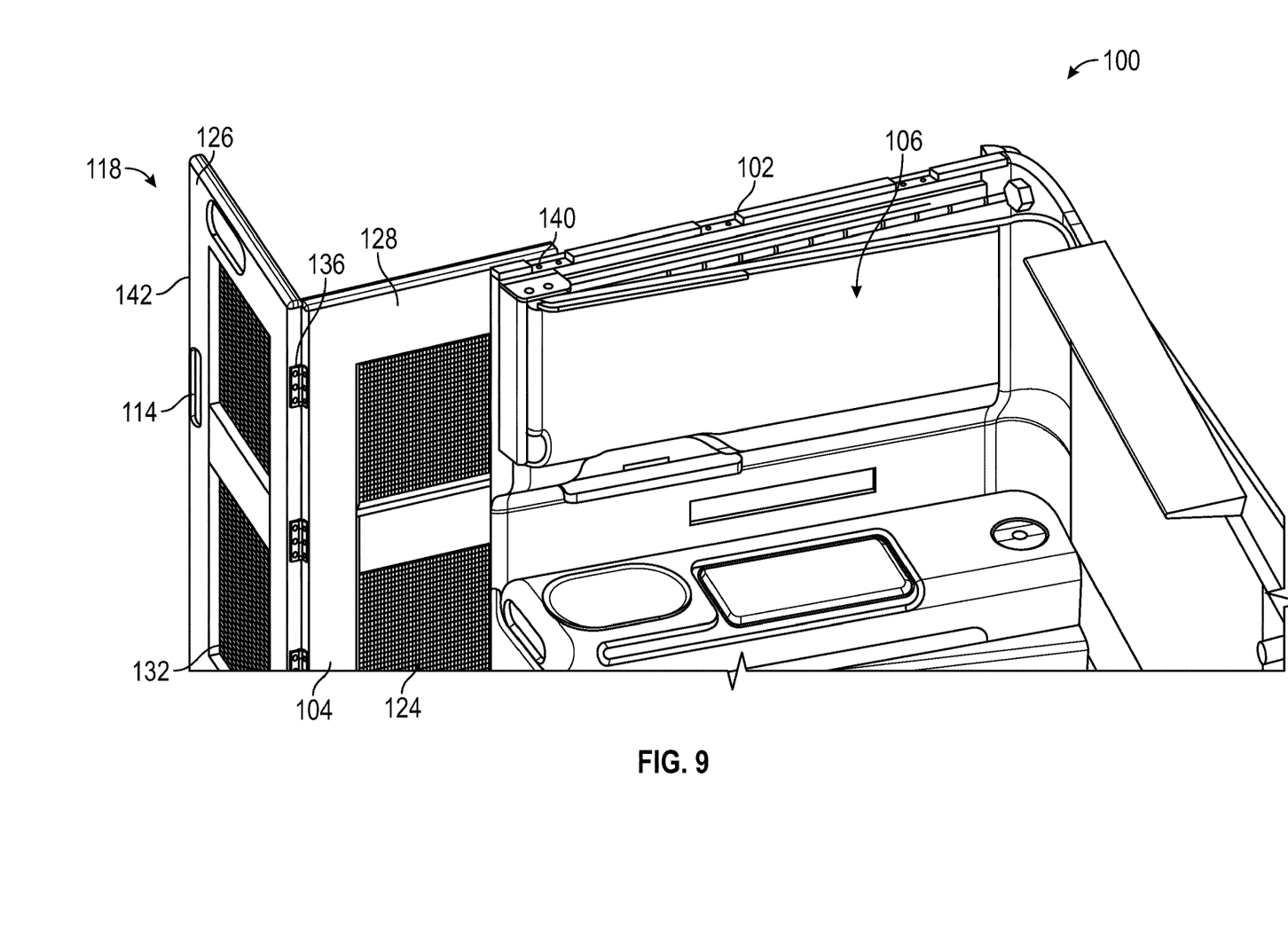
FIG. 9 is a perspective view of a portion of the passenger seat unit of FIG. 1 with the door between the folded position and the unfolded position.
Figure 10:
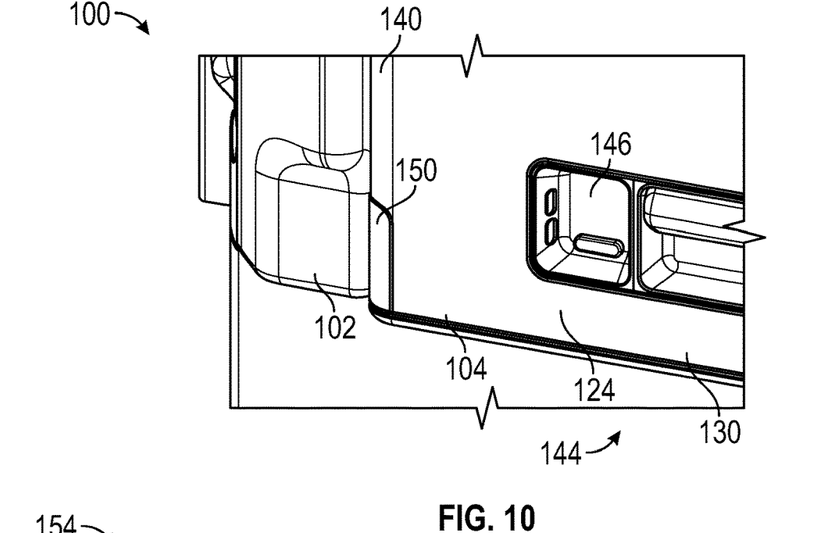
FIG. 10 is a perspective view of a portion of the passenger seat unit of FIG. 1 with a door latch.

In various embodiments, the second panel 126 is movable relative to the first panel 124 such that the door 104 may be in a folded position or an unfolded position. FIGS. 1-4 illustrate the door 104 in the unfolded position, FIGS. 5-8 illustrate the door 104 in the folded position, and FIG. 9 illustrates the door 104 at a position between the folded position and the unfolded position. The second panel 126 may be connected to the first panel 124 via various suitable mechanisms or devices as desired such that the door 104 is movable between the folded position and the unfolded position. In the embodiment of FIGS. 1-16, at least one vertical hinge 136 connects the second panel 126 with the first panel 124.

As best illustrated in FIGS. 1-4, in the unfolded position, the first surface 128 of the first panel 124 and the first surface 132 of the second panel 126 may face a same direction, and the second surface 130 of the first panel 124 and the second surface 134 of the second panel 126 may face the same direction. In the embodiment illustrated in FIGS. 1-4, in the unfolded position, the first surface 128 and the first surface 132 may face towards the passenger seat area 106, and the second surface 130 and the second surface 134 may face away from the passenger seat area 106. In various embodiment, in the unfolded position, the first surface 128 is substantially parallel to the first surface 132, and in certain embodiments, the first surface 128 may be flush with the first surface 132 such that the door 104 has a continuous surface facing towards the passenger seat area 106. Similarly, in the unfolded position, the second surface 130 may be substantially parallel to the second surface 134, and in certain embodiments, the second surface 130 may be flush with the second surface 134 such that the door 104 has a continuous surface facing away from the passenger seat area 106.

In various embodiments, in the unfolded position, the second panel 126 is substantially aligned with the first panel 124 in the forward and aft direction 138 (see, e.g., FIG. 1). In certain embodiments, in the unfolded position, the first panel edge 140 of the first panel 124 may define an aft-most edge of the door 104, and the second panel edge 142 of the second panel 126 may define a forward-most edge of the door 104 opposite from the first panel edge 140.

As best illustrated in FIGS. 5-8, in the folded position, a length of the door 104 is less than a length of the door 104 in the unfolded position. In various embodiments, in the folded position, the second panel 126 is folded back onto the first panel 124 such that the first surface 128 of the first panel 124 faces in a direction that is opposite from the direction that the first surface 132 of the second panel 126 is facing. In the embodiment illustrated in FIGS. 5-8, the first surface 128 of the first panel 124 may face towards the passenger seat area 106, and the first surface 132 of the second panel 126 may face away from the passenger seat area 106. In this embodiment, the second surface 130 of the first panel 124 and the second surface 134 of the second panel 126 may face each other, and optionally may abut or otherwise contact each other. As best illustrated in FIGS. 5-8 and 14-16, in the folded position, the first panel edge 140 of the first panel 124 and the second panel edge 142 of the second panel 126 may both be aft edges of the door 104. In certain embodiments, the door 104 in the folded position optionally includes the second panel 126 in an orientation that is approximately 180° from the orientation of the second panel 126 in the unfolded position. In various embodiments, and as discussed in detail below, the door 104 may be in the folded position during a TTL situation.

In the folded position, the second panel 126 may be selectively secured to the first panel 124 such that its relative position is maintained, or the second panel 126 may be unsecured to the first panel 124 such that the second panel 126 is movable via the vertical hinge 136 (or other connecting component). In some embodiments, the door 104 includes a door latch system 144 that selectively secures the door 104 in the folded position. It will be appreciated that depending on the type of door latch system 144 utilized, the door latch system 144 may include various other and/or additional components as desired. As such, the particular door latch system 144 illustrated should not be considered limiting, and the door latch system 144 may be various suitable devices or mechanisms for selectively retaining the door 104 in the folded position.

In the embodiment illustrated, the door latch system 144 is a slam latch system that includes a first latch component 146 on the first panel 124 and a second latch component 148 on the second panel 126 that is complimentary to and/or otherwise selectively engages the first latch component 146. The second latch component 148 engaged with or otherwise connected to the first latch component 146 may secure the second panel 126 relative to the first panel 124, while the second latch component 148 disengaged or otherwise disconnected from the first latch component 146 may allow the second panel 126 to be movable relative to the first panel 124. In some cases, the first latch component 146 may be positioned on or proximate to the first panel edge 140. In these embodiments, the first latch component 146 at a position that is spaced apart from the vertical hinge 136 (or other connecting component) may improve the ability of the door latch system 144 to retain the door 104 in the folded position.

Figure 15:
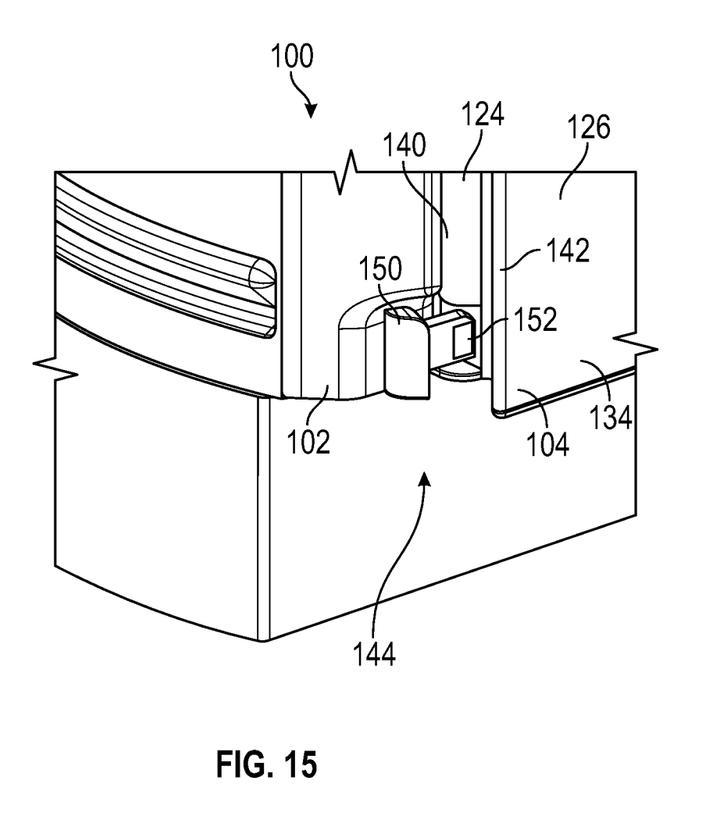
FIG. 15 is a perspective view of another portion of the passenger seat unit of FIG. 1 with the door latched in the folded position.
Figure 16:
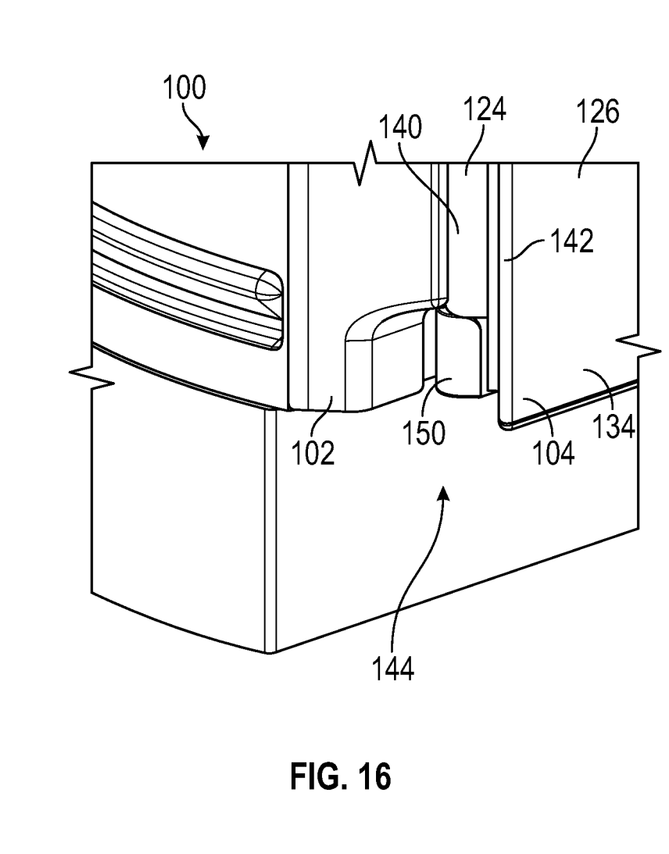
FIG. 16 is a perspective view of the portion of the passenger seat unit of FIG. 1 with the door unlatched in the folded position.

Optionally, and as best illustrated in FIGS. 10, 13, 15, and 16, the door latch system 144 includes an indicator 150 that selectively provides a visual indication of whether the second panel 126 is latched or otherwise secured to the first panel 124. In certain embodiments, the indicator 150 may be provided on the first panel 124, and optionally may be provided on the first panel edge 140. In various embodiments, the indicator 150 may be provided on the door 104 such that the indicator 150 is outside of the passenger seat area 106. However, in other embodiments, the indicator 150 may be provided at various other locations on the door 104 as desired. FIG. 15 illustrates a non-limiting example of the indicator 150 in an activated configuration indicating that the second panel 126 is latched to the first panel 124. As illustrated in FIG. 15, in this embodiment, the indicator 150 extends outwards (e.g., in the forward and aft direction 138) from the first panel edge 140 and optionally such that a visual marker 152 is visible. FIG. 16 illustrates a non-limiting example of the indicator 150 in a deactivated configuration indicating that the second panel 126 is not latched or otherwise secured to the first panel 124. As illustrated in FIG. 16, in this embodiment, the indicator 150 is flush and/or otherwise aligned with the first panel edge 140 and optionally such that the visual marker 152 is concealed.

In certain embodiments, the indicator 150 is coupled to the door latch system 144 such that movement of the indicator 150 from the activated configuration (FIG. 15) to the deactivated configuration (FIG. 16) may disengage the door latch system 144 such that the second panel 126 is no longer secured to the first panel 124. As an example, moving the indicator 150 from the activated configuration to the deactivated configuration may cause the first latch component 146 to become disengaged from the second latch component 148 such that the second panel 126 is movable relative to the first panel 124.

As previously mentioned, the door 104 is movable in the forward and aft direction 138. In various embodiments, the door 104 is movable in the forward and aft direction 138 while the door 104 is in the unfolded position or the unfolded position. As one-non-limiting example, FIGS. 1 and 2 illustrate the door 104 in the unfolded position and in the aft-most position, FIGS. 3 and 4 illustrate the door 104 in the unfolded position and in the forward-most position, FIGS. 5 and 6 illustrate the door 104 in the folded position and in the aft-most position, and FIGS. 7 and 8 illustrate the door 104 in the folded position and in the forward-most position.

Figure 2:
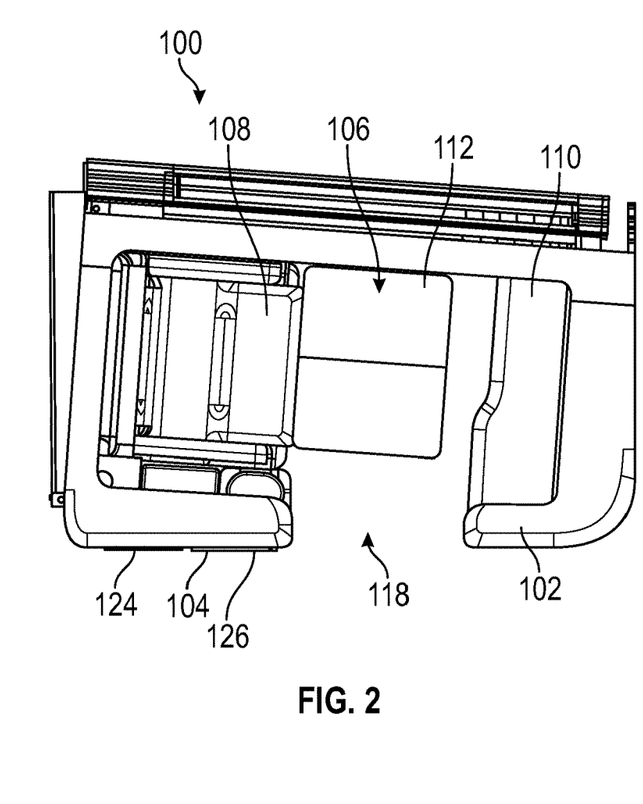
FIG. 2 is a top view of the passenger seat unit with the door in the position of FIG. 1.

As illustrated in FIGS. 1 and 2, in the unfolded, aft-most position, the door 104 maintains at least portion of the opening 118 that is unobstructed by the door 104. In the embodiment of FIGS. 1 and 2, the entire opening 118 is unobstructed by the door 104 in the unfolded, aft-most position.

Figure 3:
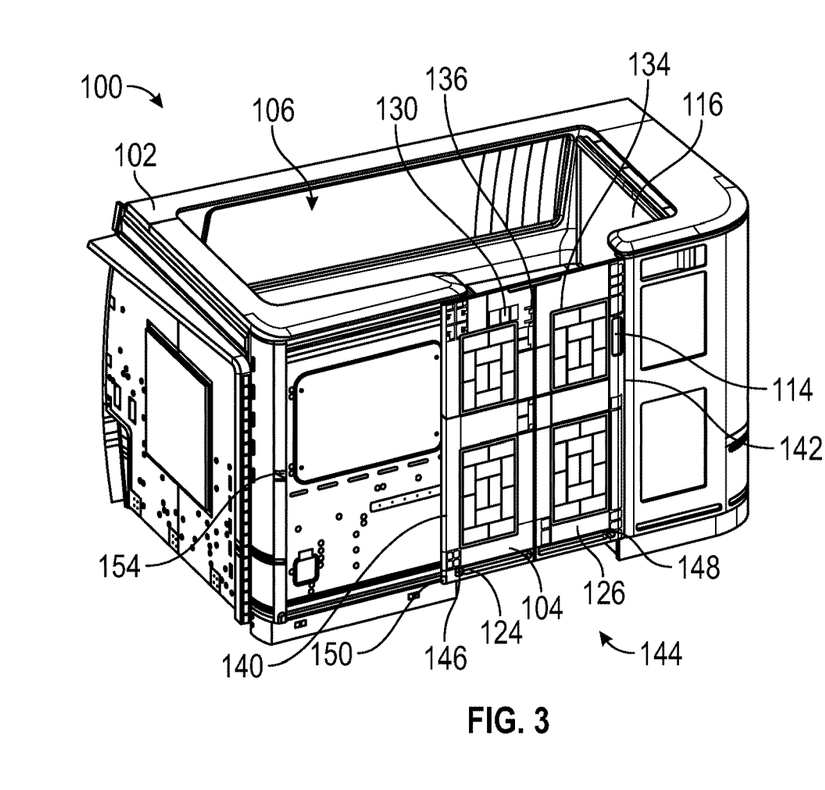
FIG. 3 is a perspective view of the passenger seat unit of FIG. 1 with the door in an unfolded, forward-most position.
Figure 4:
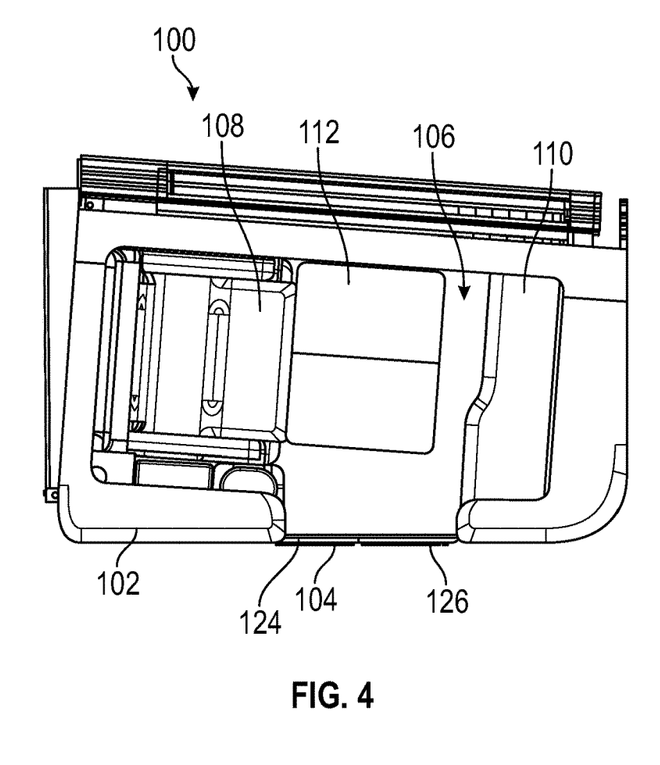
FIG. 4 is a top view of the passenger seat unit of FIG. 1 with the door in the position of FIG. 3.

Referring to FIGS. 3 and 4, in the unfolded, forward-most position, the door 104 obstructs the opening 118 (e.g., the door 104 closes off the opening 118 such that entry to and exit from the seat unit through the opening 118 is prevented).

Figure 5:
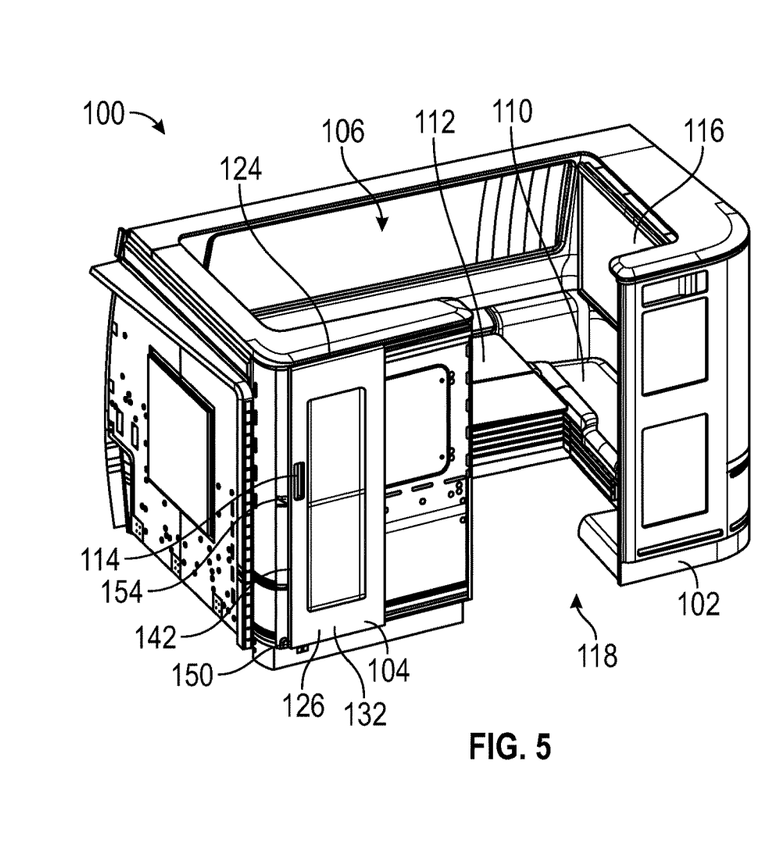
FIG. 5 is a perspective view of the passenger seat unit of FIG. 1 with the door in a folded, aft-most position.
Figure 6:
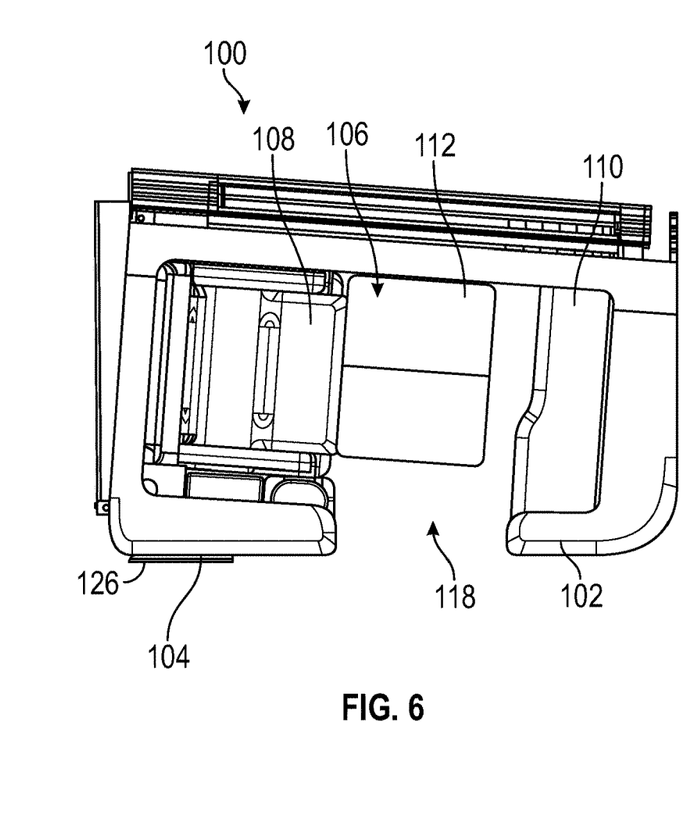
FIG. 6 is a top view of the passenger seat unit of FIG. 1 with the door in the position of FIG. 5.

Referring to FIGS. 5 and 6, in the folded, aft-most position, the door 104 maintains at least portion of the opening 118 that is unobstructed by the door 104. In the embodiment of FIGS. 5 and 6, the entire opening 118 is unobstructed by the door 104 in the folded, aft-most position.

Referring to FIGS. 7 and 8, in the folded, forward-most position, the door 104 maintains at least a portion of the opening 118 that is unobstructed by the door 104. In certain embodiments, the size of the portion of the opening 118 that is unobstructed by the door 104 in the folded, forward-most position is a minimum distance size needed for a passenger to enter or exit the passenger seat unit 100, such as during an emergency situation. In one non-limiting example, the size of the unobstructed portion of the opening 118 when the door 104 is in the folded, forward-most position is about 15 inches, although in other embodiments, the size may be less than 15 inches or greater than 15 inches.

Positioning the door 104 in the folded position and with the panels 124, 126 latched together at least during a TTL situation may allow for the passenger seat unit 100 to comply with various safety regulations because the passenger may still exit the passenger seat unit 100 if needed and/or even if the door 104 fails and moves to the forward-most position. It will be appreciated that the door 104 may be in the folded position in non-TTL situations as desired. For example, the passenger may put the door 104 in the folded position to have partial privacy or obstruction of the opening 118. Likewise, during non-TTL situations, the door 104 may be in the unfolded position (and in the forward-most or aft-most position) as desired.

A collection of exemplary embodiments are provided below, including at least some explicitly enumerated as "Illustrations" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Illustration 1. A passenger seat unit comprising: a privacy shell at least partially defining a passenger seat area, the privacy shell comprising an opening for allowing entry to and exit from the seat unit; and a door supported on the privacy shell, the door comprising a first panel and a second panel pivotably connected to the first panel such that the second panel is movable relative to the first panel between a folded position and an unfolded position, wherein a length of the door in the folded position is less than a length of the door in the unfolded position, and wherein, in the folded position, the door is movable in a forward and aft direction relative to the privacy shell.

Illustration 2. The passenger seat unit of any preceding or subsequent illustrations or combination of illustrations, wherein, in the unfolded position, the door is movable in the forward and aft direction relative to the privacy shell, and wherein, in a forward-most position or an aft-most position, the door in the unfolded position obstructs the opening of the privacy shell.

Illustration 3. The passenger seat unit of any preceding or subsequent illustrations or combination of illustrations, wherein, in the folded position, the door is movable in the forward and aft direction between a forward-most position and an aft-most position, and wherein in both the forward-most position and the aft-most position, the door in the folded position maintains at least portion of the opening that is unobstructed by the door.

Illustration 4. The passenger seat unit of any preceding or subsequent illustrations or combination of illustrations, further comprising at least one vertical hinge pivotably connecting the first panel and the second panel of the door.

Illustration 5. The passenger seat unit of any preceding or subsequent illustrations or combination of illustrations, wherein the first panel defines an aft edge of the door, wherein the door further comprises: a door latch that is configured to selectively secure the second panel to the first panel in the folded position; and an indicator along the aft edge of the door, wherein the indicator provides a visual indication of whether the second panel is latched or unlatched to the first panel.

Illustration 6. The passenger seat unit of any preceding or subsequent illustrations or combination of illustrations, wherein the privacy shell further comprises a shell latch that is configured to selectively secure the door in a forward-most position or an aft-most position, and wherein the shell latch comprises an indicator that provides a visual indication of whether the door is latched or unlatched to the shell latch.

Illustration 7. A passenger seat unit comprising: a privacy shell at least partially defining a passenger seat area, the privacy shell comprising an opening for allowing entry to and exit from the seat unit; and a door supported on the privacy shell, the door comprising a first panel and a second panel pivotably connected to the first panel such that the second panel is movable relative to the first panel between a folded position and an unfolded position, wherein, in the folded position, the door is movable in a forward and aft direction relative to the privacy shell between a forward-most position and an aft-most position, and wherein in both the forward-most position and the aft-most position, the door in the folded position maintains at least portion of the opening that is unobstructed by the door.

Illustration 8. The passenger seat unit of any preceding or subsequent illustrations or combination of illustrations, wherein, in the unfolded position, the door is movable in the forward and aft direction relative to the privacy shell, and wherein, in a forward-most position or an aft-most position, the door in the unfolded position obstructs the opening of the privacy shell.

Illustration 9. The passenger seat unit of any preceding or subsequent illustrations or combination of illustrations, further comprising at least one vertical hinge pivotably connecting the first panel and the second panel of the door.

Illustration 10. The passenger seat unit of any preceding or subsequent illustrations or combination of illustrations, wherein the first panel defines an aft edge of the door, wherein the door further comprises a door latch that is configured to selectively secure the second panel to the first panel in the folded position.

Illustration 11. The passenger seat unit of any preceding or subsequent illustrations or combination of illustrations, wherein the door further comprises an indicator along the aft edge of the door, and wherein the indicator provides a visual indication of whether the second panel is latched or unlatched to the first panel.

Illustration 12. The passenger seat unit of any preceding or subsequent illustrations or combination of illustrations, wherein the privacy shell further comprises a shell latch that is configured to selectively secure the door in a forward-most position or an aft-most position, and wherein the shell latch comprises an indicator that provides a visual indication of whether the door is latched or unlatched to the shell latch.

Illustration 13. The passenger seat unit of any preceding or subsequent illustrations or combination of illustrations, further comprising: a passenger seat in the passenger seat area; and a dual latch system configured to selectively retain the door in the folded position and in the forward-most position or the aft-most position, wherein the dual latch system comprises: a door latch on the first panel that selectively secures the second panel to the first panel in the folded position; and a shell latch on the privacy shell that selectively secures the door in the forward-most position or the aft-most position.

Illustration 14. A passenger seat unit comprising: a privacy shell at least partially defining a passenger seat area, the privacy shell comprising an opening for allowing entry to and exit from the seat unit; and a door supported on the privacy shell, the door comprising: a first panel comprising a first surface and a second surface; and a second panel comprising a first surface and a second surface, wherein the second panel pivotably connected to the first panel such that the second panel is movable relative to the first panel between a folded position and an unfolded position, wherein, in the folded position, the first surface of the second panel faces the first surface of the first panel, and, in the unfolded position, the first surface of the second panel and the first surface of the first panel face a same direction, and wherein, in the folded position, the door is movable in a forward and aft direction relative to the privacy shell.

Illustration 15. The passenger seat unit of any preceding or subsequent illustrations or combination of illustrations, further comprising at least one vertical hinge pivotably connecting the second panel to the first panel, and wherein a length of the door in the folded position is less than a length of the door in the unfolded position.

Illustration 16. The passenger seat unit of any preceding or subsequent illustrations or combination of illustrations, wherein, in the unfolded position, the door is movable in the forward and aft direction between a forward-most position and an aft-most position, and wherein in at least one of the forward-most position or the aft-most position, the door in the unfolded position obstructs the opening of the privacy shell.

Illustration 17. The passenger seat unit of any preceding or subsequent illustrations or combination of illustrations, wherein the first panel defines an aft edge of the door, wherein the door further comprises a door latch on the first panel that is configured to selectively secure the second panel to the first panel in the folded position, wherein the door further comprises an indicator along the aft edge of the door, and wherein the indicator provides a visual indication of whether the second panel is latched or unlatched to the first panel.

Illustration 18. The passenger seat unit of any preceding or subsequent illustrations or combination of illustrations, wherein: in the folded position, the first surface of the second panel faces a direction towards the passenger seat area and the first surface of the first panel faces in a direction away from the passenger seat area; and in the unfolded position, the first surface of the second panel and the first surface of the first panel both face in the direction away from the passenger seat area.

Illustration 19. The passenger seat unit of any preceding or subsequent illustrations or combination of illustrations, wherein the privacy shell further comprises a shell latch that is configured to selectively secure the door in a forward-most position or an aft-most position, and wherein the shell latch comprises an indicator that provides a visual indication of whether the door is latched or unlatched to the shell latch.

Illustration 20. The passenger seat unit of any preceding or subsequent illustrations or combination of illustrations, wherein, in the folded position, the door is movable in the forward and aft direction between a forward-most position and an aft-most position, and wherein in both the forward-most position and the aft-most position, the door in the folded position maintains at least portion of the opening that is unobstructed by the door.

Illustration 21. The passenger seat unit of any preceding or subsequent illustrations or combination of illustrations, wherein the passenger seat unit is an aircraft passenger seat unit.

Illustration 22. The passenger seat unit of any preceding or subsequent illustrations or combination of illustrations, wherein the door is slidable in the forward and aft direction relative to the privacy shell.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat unit comprising:
   a privacy shell at least partially defining a passenger seat area, the privacy shell comprising an opening for allowing entry to and exit from the passenger seat unit; and
   a door supported on the privacy shell, the door comprising a first panel and a second panel pivotably connected to the first panel such that the second panel is movable relative to the first panel between a folded position and an unfolded position; and
   a shell latch coupled to an exterior surface of the privacy shell outside of the passenger seat area and including an indicator;
   wherein:
      a length of the door in the folded position is less than a length of the door in the unfolded position,
      in both the unfolded position and the folded position, the door is movable in a forward and aft direction relative to the privacy shell between a forward-most position of the door and an aft-most position of the door, the door configured to couple to the shell latch when in the aft-most position,
      the forward-most position of the first panel is the same in both the unfolded position and the folded position, and the aft-most position of the first panel is the same in both the unfolded position and the folded position, wherein the first panel defines an aft edge of the door, wherein the door further comprises:
  a door latch configured to selectively secure the second panel to the first panel in the folded position; and
  an indicator along the aft edge of the door, wherein the indicator provides a visual indication of whether the second panel is latched or unlatched to the first panel, wherein the indicator is movable in the forward and aft direction between an activated configuration and a deactivated configuration, wherein, in the activated configuration, a visual marker providing the visual indication is visible, and, in the deactivated configuration, the visual marker is concealed, and
  wherein the indicator is coupled to the door latch such that movement of the indicator from the activated configuration to the deactivated configuration disengages the door latch such that the second panel is disengaged from the first panel.

2. The passenger seat unit of claim 1, wherein, in the unfolded position, the door is movable in the forward and aft direction relative to the privacy shell, and wherein, in the forward-most position or the aft-most position, the door in the unfolded position obstructs the opening of the privacy shell.

3. The passenger seat unit of claim 1, wherein, in the folded position, the door is movable in the forward and aft direction between the forward-most position and the aft-most position, and wherein in both the forward-most position and the aft-most position, the door in the folded position maintains at least portion of the opening that is unobstructed by the door.

4. The passenger seat unit of claim 1, further comprising at least one vertical hinge pivotably connecting the first panel and the second panel of the door.

5. The passenger seat unit of claim 1, wherein the indicator of the shell latch provides a visual indication of whether the door is latched or unlatched to the shell latch.

6. A passenger seat unit comprising:
  a privacy shell at least partially defining a passenger seat area, the privacy shell comprising an opening for allowing entry to and exit from the passenger seat unit; and
  a door supported on the privacy shell, the door comprising a first panel and a second panel pivotably connected to the first panel such that the second panel is movable relative to the first panel between a folded position and an unfolded position;
  wherein:
  in both the unfolded position and the folded position, the door is movable in a forward and aft direction relative to the privacy shell between a forward-most position and an aft-most position, wherein the forward-most position of the first panel is the same in both the unfolded position and the folded position, the aft-most position of the first panel is the same in both the unfolded position and the folded position, and
  in both the forward-most position and the aft-most position, the door in the folded position maintains at least portion of the opening that is unobstructed by the door,
  wherein the first panel defines an aft edge of the door, wherein the door further comprises:
  a door latch configured to selectively secure the second panel to the first panel in the folded position; and
  an indicator along the aft edge of the door, wherein the indicator provides a visual indication of whether the second panel is latched or unlatched to the first panel, wherein the indicator is movable in the forward and aft direction between an activated configuration and a deactivated configuration, wherein, in the activated configuration, a visual marker providing the visual indication is visible, and, in the deactivated configuration, the visual marker is concealed, and
  wherein the indicator is coupled to the door latch such that movement of the indicator from the activated configuration to the deactivated configuration disengages the door latch such that the second panel is disengaged from the first panel.

7. The passenger seat unit of claim 6, wherein, in the forward-most position or the aft-most position, the door in the unfolded position obstructs the opening of the privacy shell.

8. The passenger seat unit of claim 6, further comprising at least one vertical hinge pivotably connecting the first panel and the second panel of the door.

9. The passenger seat unit of claim 6, further comprising a shell latch configured to selectively secure the door in the forward-most position or the aft-most position, and the shell latch comprises an indicator which provides a visual indication of whether the door is latched or unlatched to the shell latch.

10. The passenger seat unit of claim 6, further comprising:
  a passenger seat in the passenger seat area; and
  a dual latch system configured to selectively retain the door in the folded position and in the forward-most position or the aft-most position, wherein the dual latch system comprises:
  the door latch; and
  a shell latch on the privacy shell that selectively secures the door in the forward-most position or the aft-most position.

11. A passenger seat unit comprising:
  a privacy shell at least partially defining a passenger seat area, the privacy shell comprising an opening for allowing entry to and exit from the passenger seat unit; and
  a door supported on the privacy shell, the door comprising:
  a first panel comprising a first surface and a second surface; and
  a second panel comprising a first surface and a second surface; and
  a shell latch coupled to an exterior surface of the privacy shell outside of the passenger seat area and including an indicator, wherein:
  the second panel pivotably connected to the first panel such that the second panel is movable relative to the first panel between a folded position and an unfolded position,
  in the folded position, the first surface of the second panel faces the first surface of the first panel, and, in the unfolded position, the first surface of the second panel and the first surface of the first panel face a same direction, wherein a forward-most position of the first panel is the same in both the unfolded position and the folded position, and wherein an aft-most position of the first panel is the same in both the unfolded position and the folded position, and
  in both the unfolded position and the folded position, the door is movable in a forward and aft direction relative to the privacy shell between a forward-most position of the door and an aft-most position of the door, wherein the first panel defines an aft edge of the door, wherein the door further comprises:
- a door latch configured to selectively secure the second panel to the first panel in the folded position; and
- an indicator along the aft edge of the door, wherein the indicator provides a visual indication of whether the second panel is latched or unlatched to the first panel, wherein the indicator is movable in the forward and aft direction between an activated configuration and a deactivated configuration, wherein, in the activated configuration, a visual marker providing the visual indication is visible, and, in the deactivated configuration, the visual marker is concealed, and
- wherein the indicator is coupled to the door latch such that movement of the indicator from the activated configuration to the deactivated configuration disengages the door latch such that the second panel is disengaged from the first panel.

12. The passenger seat unit of claim 11, further comprising at least one vertical hinge pivotably connecting the second panel to the first panel, and wherein a length of the door in the folded position is less than a length of the door in the unfolded position.

13. The passenger seat unit of claim 11, wherein, in the unfolded position, the door is movable in the forward and aft direction between the forward-most position and the aft-most position, and wherein in at least one of the forward-most position or the aft-most position, the door in the unfolded position obstructs the opening of the privacy shell.

14. The passenger seat unit of claim 11, wherein:
- in the folded position, the first surface of the second panel faces a direction towards the passenger seat area and the first surface of the first panel faces in a direction away from the passenger seat area; and
- in the unfolded position, the first surface of the second panel and the first surface of the first panel both face in the direction away from the passenger seat area.

15. The passenger seat unit of claim 11, wherein the shell latch is configured to selectively secure the door in the forward-most position or the aft-most position, and wherein the indicator provides a visual indication of whether the door is latched or unlatched to the shell latch.

16. The passenger seat unit of claim 11, wherein, in the folded position, the door is movable in the forward and aft direction between the forward-most position and the aft-most position, and wherein in both the forward-most position and the aft-most position, the door in the folded position maintains at least portion of the opening that is unobstructed by the door.

* * * * *